United States Patent [19]
Doi et al.

[11] 4,382,059
[45] May 3, 1983

[54] POWER CHANGE OPERATING METHOD OF A BOILING WATER REACTOR

[75] Inventors: Kazuyori Doi; Takashi Kiguchi; Naoyuki Yamada, all of Ibaraki, Japan

[73] Assignee: Hitachi, Ltd., Tokyo, Japan

[21] Appl. No.: 154,998

[22] Filed: May 30, 1980

[30] Foreign Application Priority Data

Jun. 6, 1979 [JP] Japan .................................. 54-70055

[51] Int. Cl.³ .............................................. G21L 7/36
[52] U.S. Cl. .................................... 376/210; 376/218
[58] Field of Search .................... 176/20 R, 22, 24; 376/215, 218, 210, 211

[56] References Cited

U.S. PATENT DOCUMENTS

| | | | |
|---|---|---|---|
| 3,630,839 | 12/1971 | Podolsky | 176/24 |
| 3,778,347 | 12/1973 | Giras et al. | 176/24 |
| 4,057,463 | 11/1977 | Morita | 176/36 R |
| 4,108,720 | 8/1978 | Sato et al. | 176/24 |
| 4,236,220 | 11/1980 | Kogami et al. | 176/24 |

FOREIGN PATENT DOCUMENTS

| | | | |
|---|---|---|---|
| 52-6896 | 1/1977 | Japan | 176/24 |
| 54-145895 | 11/1979 | Japan | 176/24 |
| 54-145896 | 11/1979 | Japan | 176/24 |

OTHER PUBLICATIONS

Nuclear Science & Engineering, 64, pp. 657–672, (Oct. 1977), Karppinen.
Nucl. Tech., vol. 48, (4/80), pp. 91–100, Hayse et al.

*Primary Examiner*—Sal Cangialosi
*Attorney, Agent, or Firm*—Antonelli, Terry & Wands

[57] ABSTRACT

A power change operating method of a boiling water reactor, in which an operation allowable range is defined by the relation between xenon and iodine concentrations, the present concentrations is compared with the allowable range, and the core flow is controlled so that the concentrations after the change can be included within the allowable range.

4 Claims, 7 Drawing Figures

POWER CHANGE OPERATING METHOD OF A BOILING WATER REACTOR

BACKGROUND OF THE INVENTION

The present invention relates to a power change operating method of a boiling water reactor.

The power change of a boiling water reactor (hereinafter referred to as a BWR) can be realized by a control rod operation by a core flow changing operation. The present invention will be described as to the power change driving operation resorting mainly to the core flow. Between this core flow and the thermal power, an operation allowable range is predetermined. The operation allowable range is defined by a minimum pump speed line of recirculation pump speed, an APRM rod block monitor line by the thermal restriction of a fuel assembly, a minimum power line relating to pump cavitation, and a 100% pump speed line of the recirculation pump speed. During the power change, there arises a change in the concentration of a fission product or xenon. Since the concentration change of xenon results in a considerable change in reactivity, the core flow has to be greatly changed in order to maintain the thermal power after the change constant. The change in the core flow under a low power condition raises no problem because it is in a direction apart from the restricting value. Under a return condition to a high power, there is possibility of the power going out of the operation allowable range. According to the conventional operating method, whether an operation restricting condition is violated or not has been judged on the basis of the analytical results of an off-line calculation or the operational experiences of the operator with the use of a power-flow map.

SUMMARY OF THE INVENTION

It is an object of the present invention to provide a power change operating method which can judge easily without any requirement for the off-line analytical results nor the operational experiences whether or not the core flow immediately after the return to the high power or upon the maintenance at the high power violates the operation restricting condition when the power is changed and which can establish such a change power level as does not violate the operation restricting condition in the case of the non-violation.

The gist of the present invention resides in the concept of changing the power level in accordance with the operation allowable range on the xenon-iodine map. The operation allowable range on the power-flow map, which is obtained from the BWR, is made to correspond to that on the xenon-iodine map. The power level to be able to change, which is within the operation allowable range, is determined from the relation between the xenon and iodine concentrations at present and the operation allowable range of the xenon-iodine map.

THE PREFERRED EMBODIMENT OF THE INVENTION

Figure 1:
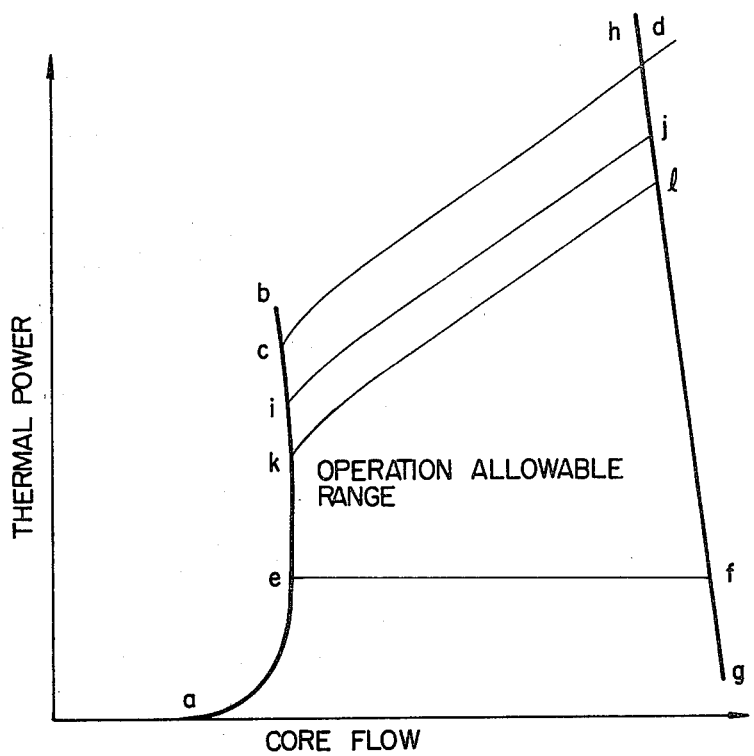
FIG. 1 is a graphical presentation illustrating the operation restricting condition on the power-flow map.
Figure 2:
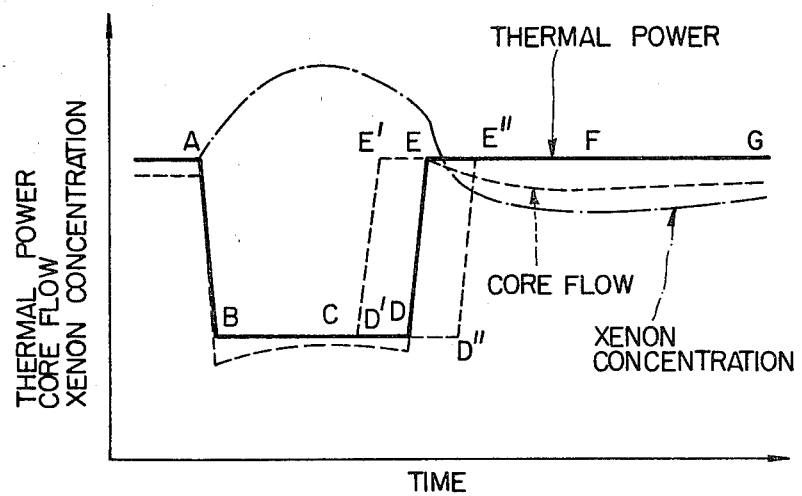
FIG. 2 is a graphical presentation illustrating the core characteristic changes upon the power change.

In FIG. 1, line ab indicates a minimum pump speed line of recirculation pump speed, cd and APRM rod block monitor line by the thermal restriction of a fuel assembly, ef a minimum power line relating to pump cavitation, and gh a 100% pump speed line of the recirculation pump speed. As mentioned before, the operation allowable range is surrounded or defined by those lines. On the other hand, a curve ij is called a flow control line, which indicates a power change when the core flow is changed in a certain control rod pattern. With the change in the control rod pattern, the flow control line is shifted in parallel from the aforementioned ij to a line Ke. During the power change, as shown in FIG. 2, there arises a change in the concentration of a fission product or xenon. Since the concentration change of xenon results in a considerable change in reactivity, the core flow has to be greatly changed in order to maintain the output after the change constant. The core characteristics changes with time are illustrated in FIG. 2, and the loci of the thermal power (hereafter referred to as the power) and the core flow rate are illustrated as a powerflow map in FIG. 3. In addition to the core flow and the power, incidentally, the xenon concentration is used as a parameter in FIG. 2. The loci A-B-C-D-E-F-G appearing in FIGS. 2 and 3 indicate the changing procedures. The change in the core flow under a low power condition (or the loci B-C-D) raises no problem because it is in the direction apart from the restricting value. Under a return condition to a high power (or the loci E-F-G), on the contrary, the core flow may possibly violate the operating restricting condition upon the high power return in accordance with the condition (or the point D) just before the return. For instance, if the power is increased from a point D' (which is located before the core flow reaches the D point of FIG. 2), the operation restricting condition is violated at a point E'. On the other hand, if the power is increased from a point D" (which is reached when the low power condition is maintained for a long time) through a point E", the operation restricting condition is violated at a point F' (which is the minimum flow point after the high power return).

The present invention provides to a power change operating method which can carry out easily without any requirement for the off-line analytical results nor the operational experiences.

The present invention will be described in more detail in the following.

As has been described in the above, the change in the core flow after the return to the high output can be made to linearly correspond to the transitional change in the xenon concentration. Therefore, the core flow restricting values (i.e., the upper and lower limits) upon the return to the high power are defined by the restricting values of the xenon concentration. The transitional changes in the xenon and iodine concentrations are defined by the following characteristic differential equations:

$$\frac{dI}{dt} = \gamma_I \Sigma_f P - \lambda_I I; \quad (1)$$

and $$\frac{dXe}{dt} = \gamma_X \Sigma_f P + \lambda_I I - \lambda_X Xe - \delta_X Xe P, \quad (2)$$

wherein:

Xe and I: Mean Concentrations of $Xe^{135}$ and $I^{135}$ at
$\Sigma_f$: Mean macroscopic fission cross section at Core;
P: Mean thermal power at Core;
$\lambda_X$ and $\lambda_I$: Decay Constants of $Xe^{135}$ and $I^{135}$; and
$\gamma_X$ and $\gamma_I$: Numbers of $Xe^{135}$ and $I^{135}$ Generated at Each Fission.

Figure 3:
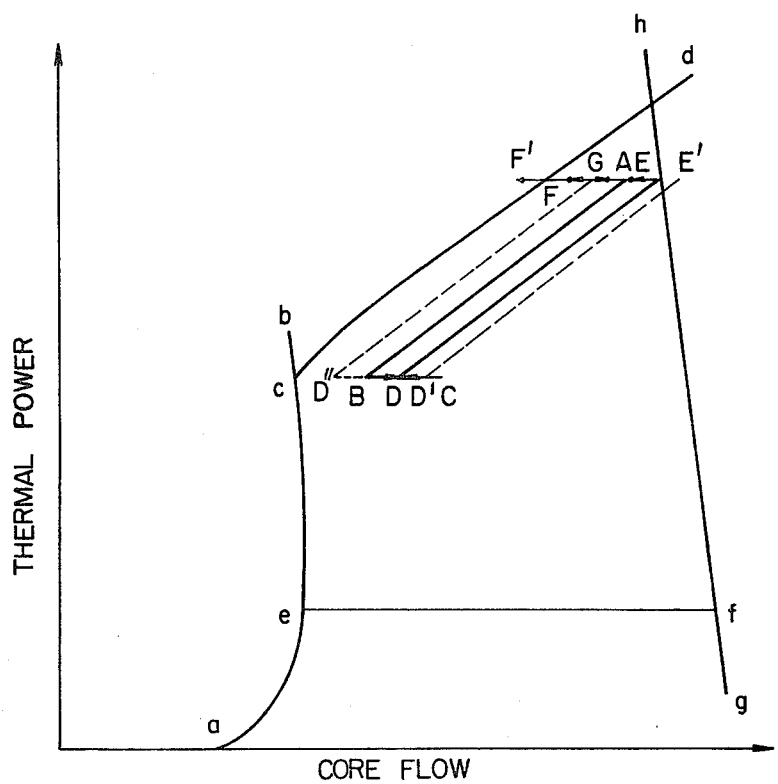
FIG. 3 is a graphical presentation illustrating the power and flow locus upon the power change.
Figure 4:
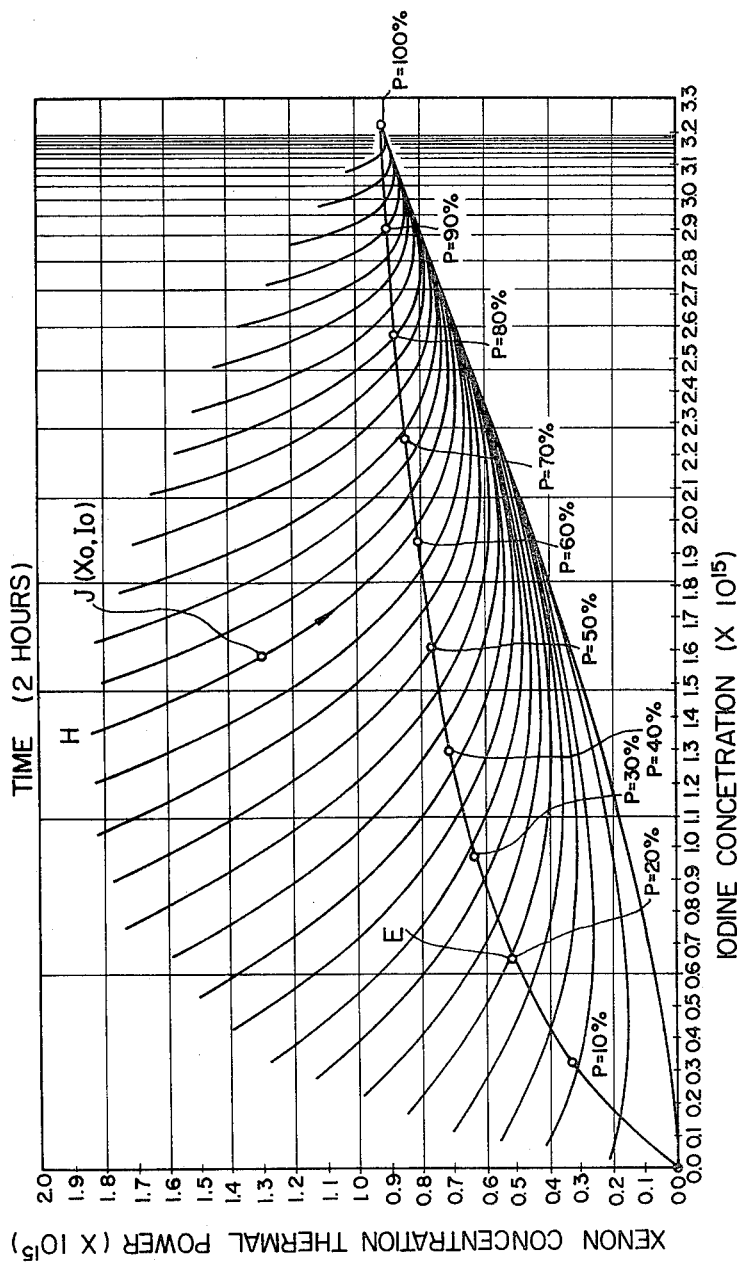
FIG. 4 is a graphical presentation illustrating one of the xenon-iodine maps.
Figure 5:
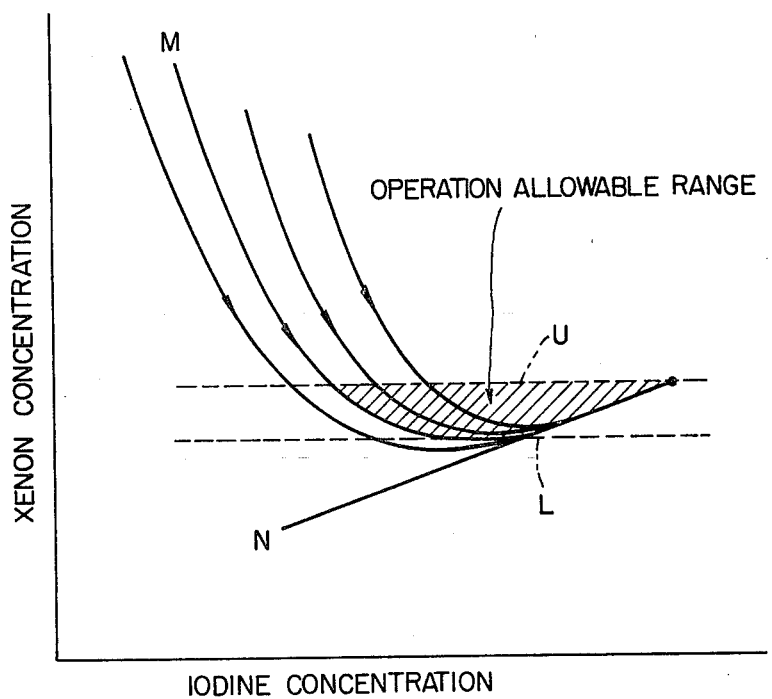
FIG. 5 is a graphical presentation illustrating how the operation allowable range is determined in the xenon-iodine map.
Figure 6:
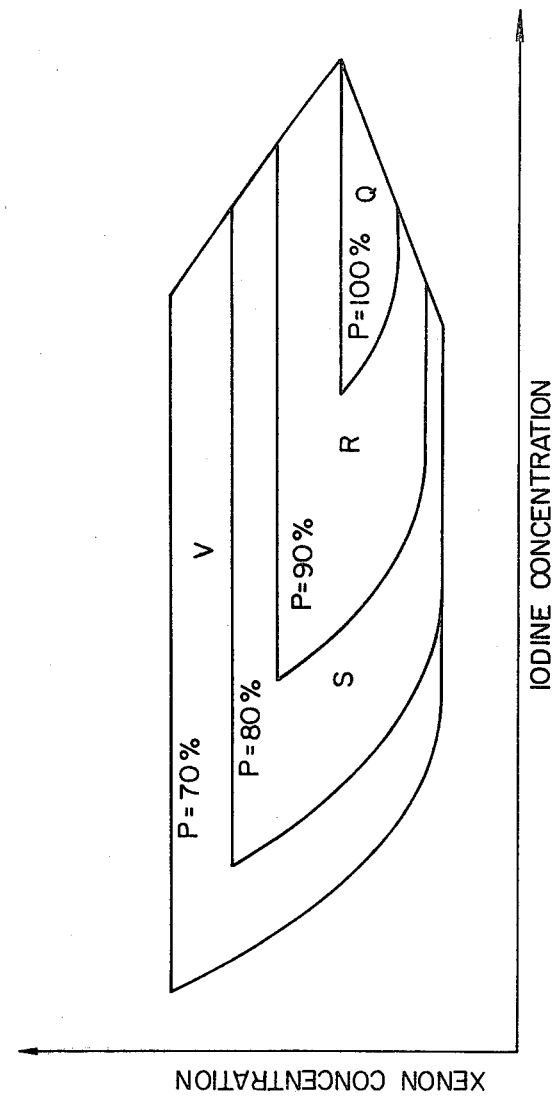
FIG. 6 is a graphical presentation illustrating one example of the aforementioned operation allowable ranges.

Equations (1) and (2) are used to determine the transitional changes in the xenon and iodine concentrations after the power changes for various initial values, and the transitional changes thus determined are plotted in the xenon-iodine map. An example of the xenon-iodine map for the attained output of 100% is illustrated in FIG. 4. In this Figure, if the condition just before the return to the high power is indicated at the J point (i.e., the xenon concentration of Xo and the iodine concentration of Io) in the curve H, the xenon and iodine concentrations after the return to the high power (i.e., P=100%) are changed along the curves H. More specifically, it will be understood that the iodine concentration is monotonously increased whereas the xenon concentration is once decreased and the monotonously increased until it reaches an equilibrium point E (at the output of 100%). Incidentally, the equilibrium point implies the condition, under which the xenon and iodine are balanced. Here, the restricting values of the xenon concentration corresponding to the restricting values (which have their upper limit U corresponding to the line gh in FIG. 3 and their lower limit L corresponding to the line cd) of the core flow after the return to the high power (100%) are determined and written in the xenon-iodine map (as shown in FIG. 5). The upper limit U of the xenon concentration implies the restricting value, until which the core flow immediately after the return to the high power (100%) does not violates the line gh (as shown in FIG. 3). On the other hand, the lower limit L of the xenon concentration implies the restricting value, until which the minimum of the core flow after the return to the high power (100%) does not violate the line cd (as shown in FIG. 3.) As a result, the operation allowable range, within which the core flow upon the return to the high power is between the restricting values, is depicted by the region (or the hatched portion) which is defined by the aforementioned two upper and lower limits, by the xenon-iodine loci (or curves M) tangential to the lower limit and by the straight line N implying such a boundary as does not allow the xenon and iodine to exist. If the xenon and iodine concentrations immediately before the high power return are within that range, the core flow is free from violating the operation restricting condition even after the return to the power condition of 100%. By the procedures thus far described, the operation allowable range is determined from the xenon-iodine map upon the various changes in the final power and is written in the map. One of these examples is illustrated in FIG. 6. In this Figure, the allowable ranges Q, R, S and V are illustrated for P=100%, 90%, 80% and 70%, respectively. The method of using that map upon the power change will be explained in the following. Equations (1) and (2) are used to determine the xenon and iodine concentrations at each instant by the real time operation. Immediately before the return to the high power, the xenon and iodine concentrations at that instant are compared with the operation allowable range of FIG. 6. Then, it can be easily judged that the return to 100% can be effected if the concentrations are within the range Q, that the return to 90% can be effected if the concentrations are within the range R.

Although, in the foregoing description, the operation allowable range in the xenon-iodine map is determined with the control rod pattern being a preset constant, similar methods to the above can still be used, when the output is additionally changed while resorting to the control rod operation, by determining the operation allowable range in the xenon-iodine map for each control rod pattern.

Figure 7:
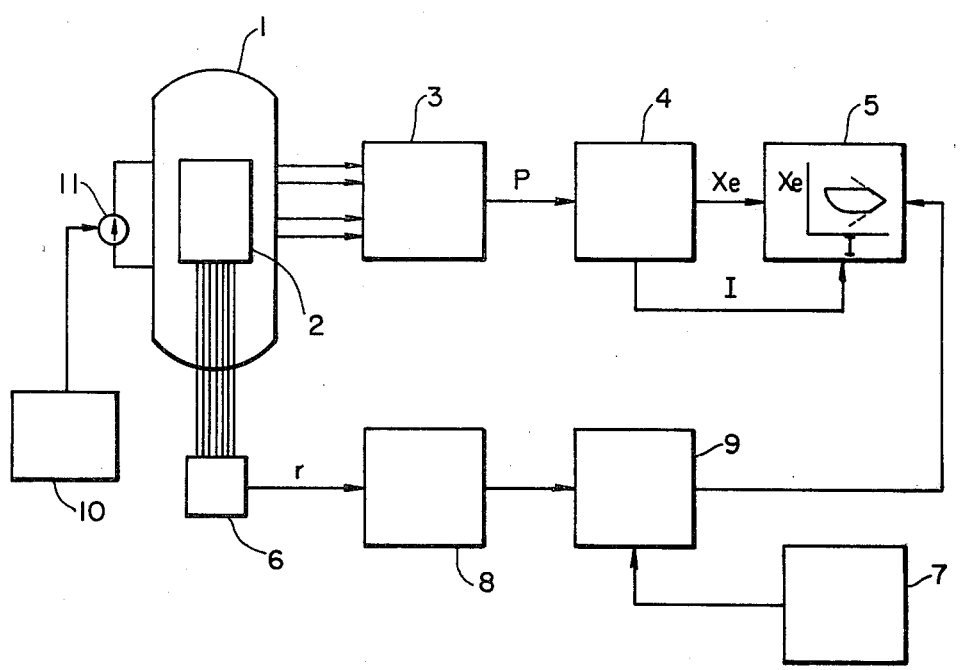
FIG. 7 is a block diagram showing the embodiment of the present invention.

An embodiment of the present invention will now be described with reference to FIG. 7. A thermal power calculator 3 calculates the thermal power P at each instant by the use of the heat balance data which are obtained from the core 2 of a reactor pressure chamber 1. A xenon differential equation calculator 4 calculates the xenon and iodine concentrations with the use of the calculated power P on the basis of the aforementioned Equations (1) and (2). Then, the xenon and iodine concentrations thus calculated are fed to a CRT display device 5 so that the former is plotted in the ordinate whereas the latter is plotted in the abscissa. In this meanwhile, a xenon-iodine map maker 7 makes the xenon-iodine maps, which are started from various initial values, by using the final power as a parameter on the basis of Equations (1) and (2) and then feeds them to an operation allowable range maker 9. On the other hand, a xenon restricting value calculator 8 has an output-flow map and uses the control rod pattern signal r from a control rod drive device 6 thereby to calculate the upper and lower limits of the xenon concentration, which are determined by using the final power as the parameter, and to feed the calculated limits to the aforementioned operation allowable range maker 9. In response to these two input signals, the operation allowable range maker 9 determines the operation allowable range corresponding to that of FIG. 6 and feeds it to the aforementioned CRT display device 5. As a result, the operator judges whether or not the power change required can be realized from the operation allowable range display in the CRT display device 5 and from the relationships between the xenon and iodine concentrations so that he can determine such a power level in the case of the non-violation as does not violate the operation restricting condition. The core flow, and therefore the thermal power can be control by changing the speed of the recirculation pump 11 through an operator console 10. The operator, therefore, can make the power changing operation quickly responsive. If the power change required is higher than the attainable power, a safer operation of the BWR can be realized by gradually increasing the power up to the restricting value, by awaiting the changes in the xenon and iodine concentrations and by further increasing the power when spare capability is established.

What is claimed is:

1. A method for changing thermal power of a nuclear reactor by controlling the speed of a recirculation pump of the reactor comprising the steps of:
    (a) calculating the current thermal power in accordance with heat balance signals derived from the reactor and generating electrical signals of the thermal power;
    (b) calculating xenon and iodine concentrations in accordance with the electrical signals of the thermal power and generating electrical signals of the xenon and iodine concentrations;
    (c) calculating upper and lower limits of xenon concentration for different final power values in accordance with the relation between the thermal power and core flow in the current control rod pattern and generating electrical signals of the upper and lower limits;
    (d) calculating transitional changes in the xenon and iodine concentrations after a power change for different initial values in accordance with the following equations, $$\frac{DI}{dt} = \gamma_I \epsilon_f P - \lambda_I I$$

and $$\frac{dXe}{dt} = \gamma_{Xe} \epsilon_f P + \lambda_I I - \lambda_X Xe - \delta_X Xe P,$$

wherein:
Xe and I: Mean concentrations of $Xe^{135}$ and $I^{135}$ at
$\Sigma_f$: Means macroscopic fission cross section at core,
P: Mean thermal power at core,
$\lambda_X$ and $\lambda_I$: Decay constants of $Xe^{135}$ and $I^{135}$, and
$\gamma_X$ and $\gamma_I$: Numbers of $Xe^{135}$ and $I^{135}$ generated at each fission,
and generating electrical signals of the transitional changes;
    (e) determining operating allowable ranges for the different initial values in accordance with the electrical signals generated in steps (c) and (d); and
    (f) controlling the speed of the recirculating pump to maintain the current xenon and iodine concentrations within the operating allowable range.

2. A method according to claim 1, wherein the reactor is a boiling water reactor and including the steps of supplying the electrical signals of the xenon and iodine concentrations to a display device, and displaying the concentrations.

3. A method according to claim 2, further including the step of displaying the determined operating allowable ranges on the display device.

4. A method according to claim 1 or claim 2, wherein the operating allowable ranges for the different initial values are determined and stored prior to carrying out step (a).

* * * * *